United States Patent Office 3,223,438
Patented Dec. 14, 1965

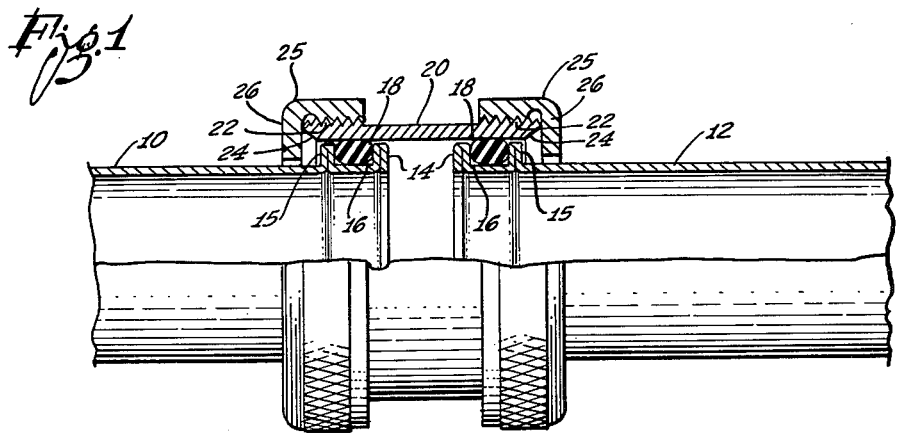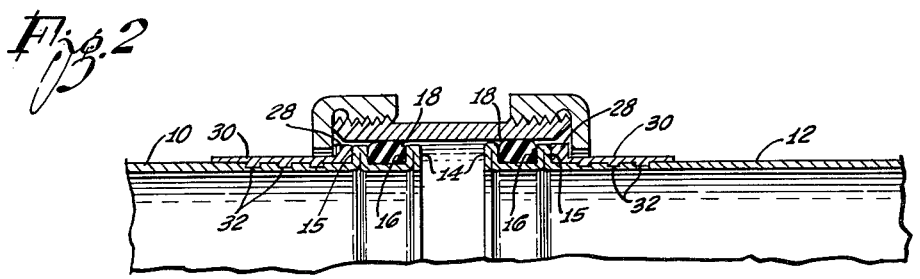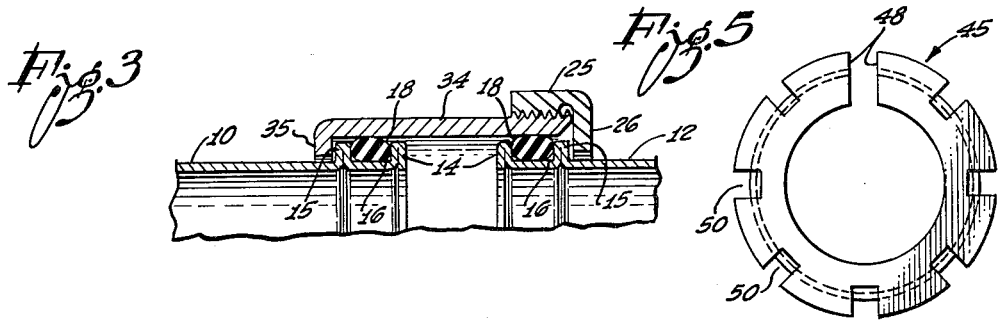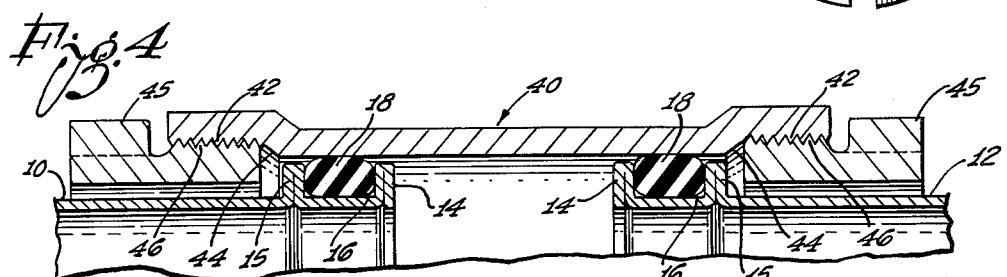
INVENTOR:
Herbert A. DeCenzo
Attorneys

3,223,438
COUPLING
Herbert A. De Cenzo, Arcadia, Calif., assignor to Purolator Products, Inc., a corporation of Delaware
Filed June 20, 1960, Ser. No. 37,480
5 Claims. (Cl. 285—233)

This invention relates to a coupling for interconnecting two tubes or the like in a fluid-tight manner. In the preferred practice of the invention, the coupling not only permits relative axial movement of the two tubes but also permits an appreciable degree of angular adjustment.

Broadly described, the coupling comprises a pair of flanges on the end of each of the two tubes forming a circumferential channel to seat a suitable sealing ring which may be an O-ring. The two ends of the tubes are bridged by a cylindrical coupling body that surrounds the two pairs of flanges and the two sealing rings that are retained by the flanges. Radially inwardly extending means at the two ends respectively of the coupling body confine the flanges of the two tube ends to limit separation movement of the two tubes.

Fluid-tight sealing is accomplished by using sealing rings of an unrestrained radial dimension greater than the radial clearance between the bottoms of the grooves and the surrounding coupling body so that the coupling body maintains each sealing ring under effective radial compression. Freedom for axial adjustment is provided by the liberal dimension in length of the coupling body. Freedom for angular adjustment of the two tubes relative to each other is achieved by making the inside diameter of the coupling body larger than the outside diameter of the tube flanges.

At least one of the two inwardly extending flange-engaging means at the two respective ends of the coupling body may be either in the form of an internally threaded nut or the like or in the form of an externally threaded bushing or the like. In this regard, a feature of the invention is the concept of employing such screw-threaded means for forcing the coupling body over the corresponding sealing ring for placing the sealing ring under radial compression. For this purpose, the corresponding end of the coupling body is flared to facilitate its advance over the sealing ring.

One practice of the invention has special utility for coupling thin-walled tubes. In this practice of the invention, each of the two ribs on the end of each tube is formed simply by folding the tube wall to form a double thickness flange. If desired, each of the thin-walled tubes may be provided with a ferrule having a radial flange for cooperation with the inwardly extending flange-engaging means on the corresponding end of the coupling body. Such a ferrule flange may abut and reinforce the rearmost folded flange of the tubing, such a construction being advantageous for the higher fluid pressures.

A problem encountered in the use of such a coupling is to install the two inwardly extending flange-engaging means behind the flanges of the two tubes. In some instances, it is not feasible to install the inwardly extending flange-engaging means before the tube flanges are formed and neither is it feasible to slip such flange-engaging means over the opposite end of each tube for movement along the length of the tube. In such instances, the inwardly extending flange-engaging means at the two ends of the coupling body may be in the form of externally threaded bushings of split construction. The split construction permits the bushings to be expanded sufficiently to clear the tube flanges. The split bushings are then contracted to their normal diameters and thereafter are effectively confined against expansion by the surrounding coupling body.

The features and advantages of the invention may be understood from the following detailed description together with the accompanying drawing.

In the drawing, which is to be regarded as merely illustrative:

FIG. 1 is a view partly in longitudinal section and partly in side elevation showing a selected embodiment of the invention in which the coupling body has two nut members at its opposite ends;

FIG. 2 is a fragmentary longitudinal sectional view of a similar embodiment of the invention incorporating reinforcement ferrules;

FIG. 3 is a fragmentary longitudinal sectional view showing how a coupling body may be employed with an integral radially inward flange at one end and with a nut member on the other end;

FIG. 4 is a fragmentary longitudinal sectional view of another embodiment of the invention in which the two ends of the coupling body are provided with split bushings;

FIG. 5 is a face view of one of the split bushings; and

FIG. 6 is a fragmentary sectional view showing how a flared end of a coupling body may be advanced by screw action to place a sealing ring under effective radial compression.

The drawing shows four embodiments or variations of a coupling for interconnecting the confronting ends of a pair of thin-walled tubes 10 and 12. In each of the embodiments, each tube end is provided with a plurality of radial flanges which includes two spaced flanges forming a circumferential groove to receive a sealing ring, such as an O-ring. Thus each tube end has a forward flange 14 and a rearward flange 15 spaced therefrom to form a groove 16 to receive an O-ring 18. In each embodiment of the invention, a coupling body encloses the O-rings and flanges of the tube ends in sealing contact with the O-ring, and in each embodiment of the invention, the coupling body has inwardly extending means at its two ends respectively to confine the tube flanges thereby to limit axial separation of the two tubes.

In the embodiment shown in FIG. 1, the coupling body 20 is a simple cylindrical member with an external screw thread 22 at each of its two ends and each of the two ends of the coupling body is chamfered to form a taper or flare 24 to facilitate movement of the coupling body over an O-ring 18. The two inwardly extending means at the two respective ends of the coupling body 20 that confine the tube flanges comprise two nuts 25 for threaded engagement with the external screw threads. Each of the nuts 25 has a radially inwardly extending flange 26 which is of larger inside diameter than the diameter of the corresponding tube but smaller than the outside diameter of the adjacent tube flange.

The unrestrained radial dimension of each of the O-rings 18 is substantially less than the radial clearance between the bottom of the groove 16 in which the O-ring is seated and the surrounding inner circumferential surface of the coupling body 20. Consequently, in the assembled coupling, the two O-rings 18 are under substantial radial compression for sealing contact both with the bottom of the groove and the surrounding coupling body.

In the preferred practices of the invention, the outside diameter of the tube flanges 14 and 15 is appreciably less than the inside diameter of the coupling body 20 to provide clearance around the peripheries of the tubing flanges. These clearances, together with the radial clearance between the tubes and the nut flanges 26, provide substantial freedom for the two tubes to be adjusted angularly relative to each other. It is also to be noted that the length of the coupling body 20 permits a substantial gap between the two tube ends and thus provides a liberal range for axial adjustment of the two tubes relative to each other. This range of axial adjustment provides tolerance with respect to the spacing between the confronting tube ends and also accommodates longitudinal thermal expansion and contraction of the two tubes.

If the separation force between the two tubes is carried by abutment of the tube flanges 15 with the corresponding nut flanges 26, a tube flange 15 will fulcrum against a nut flange if one of the two tubes is swung out of axial alignment with the other tube. On the other hand, if the separation force is not carried by the coupling body 20, the two tube flanges 15 being out of contact with the corresponding nut flanges 26, a tube will fulcrum on its O-ring 18 when the tube is swung out of axial alignment with the other tube. When one of the tubes is at an angle to the other tube, the corresponding O-ring may be canted relative to the surrounding coupling body 20 but, if so, the radially compressed resilient sealing ring is correspondingly elliptically deformed to maintain sealing contact with the coupling body.

An important feature of the selected embodiments of the invention is the concept of forming the flanges 15 and 16 on a tube by simply folding the thin wall of the tube so that each flange comprises a double thickness of the tube material. One advantage of such a construction is that it makes it unnecessary to provide each tube end with a special flanged fitting and thus reduces the cost of the coupling. A more important advantage in many situations is the saving in weight in the omission of such a special flanged fitting on each tubing end. This consideration is especially important in aircraft construction where a small saving in weight on each of several hundred couplings on an airplane can amount to a significant total.

It is to be noted that the parts are so dimensioned and related that the external screw threads 22 of the coupling body 20 and the internal screw threads of the nuts 25 may cooperate in a force-multiplying manner to force the ends of the coupling body over the corresponding O-rings 18 for effective radial compression of the O-rings. There is, of course, a force-multiplying effect in the use of the screw threads and a further force-multiplying effect in the wedging action of the flared ends of the tubing body on the sealing rings. This feature may be understood by reference to FIG. 6 where the flared end portion 24 of a coupling body 20 is poised for advance over an O-ring 18 by screw action.

To assemble the coupling shown in FIG. 1, either the two nuts 25 are inserted on the leading ends of the tubes before the walls of the tubes are folded to form the flanges 15 and 16 or else the opposite ends of the tubes are formed without flanges to permit the nuts to be installed from the opposite ends. The two O-rings 18 are temporarily stretched as necessary to pass over the forward flanges 14 to reach the grooves 16. The coupling body 20 is then placed in position to bridge the two tube ends with the flared portions 24 at the opposite ends of the coupling body in abutment with the unrestrained O-rings 18, as indicated in FIG. 6. It will be noted that in FIG. 6 the radial dimension of the flare surface, i.e., the difference between the maximum radius at the outer end of the flare surface and the minimum radius at the inner end of the flare surface it at least one-fourth of the diameter of the O-ring 18. The two nuts 25 are then tightened to advance by screw action thereby to force the two O-rings into assembled positions inside the coupling body with consequent radial compression of the sealing rings. It is to be further noted that the radial compression of each of the O-rings tends to cause elongation of the O-ring in lateral cross dimension, i.e., axial elongation, but the groove in which the O-ring is confined is dimensioned in width to oppose such elongation and thus increase the radially outward and radially inward sealing pressure exerted by the O-ring.

The second embodiment of the invention shown in FIG. 2 is largely identical with the first embodiment as indicated by the reference numerals. The only difference is the pluralities of flanges at each end of each tube which includes a flange 28 of a corresponding ferrule 30. Each ferrule 30 may be formed with inner circumferential ribs 32 with the corresponding tube swaged into permanent positive engagement with the ribs in a fluid-tight manner.

Since each ferrule flange 28 is the rearmost flange on each of the two tube ends, the two ferrule flanges cooperate with the two nut flanges 26 to limit separation movement of the two tube ends. Thus the relatively strong ferrule flanges 28 carry any axial separation force that may be applied to the coupling and make the coupling especially suitable for higher fluid pressures. It is also to be noted in FIG. 2 that the ferrule flanges 28 abut and reinforce the rearward folded flanges 15.

The third embodiment of the invention shown in FIG. 3 is also in large part identical with the first embodiment of the invention as indicated by the reference numerals. In this instance, the coupling body 34 has a flange 35 at one end which constitutes one of the radially inwardly extending means at the two respective ends of the coupling body for confining the tube flanges against separation movement. The inwardly extending means at the other end of the coupling body 34 comprises a previously described nut 25 with a radially inward flange 26, the coupling body being formed with an external screw thread for engagement by the nut.

In the fourth embodiment of the invention shown in FIG. 4, the coupling body 40 is formed with an internal screw thread 42 at each of its opposite ends and is additionally formed with the usual taper or flare 44 adjacent the inner end of the screw thread. The radially inwardly extending means at the two ends respectively of the coupling body 40 for confining the tube flanges are in the form of bushings 45 having external screw threads 46 for releasable engagement with the corresponding internal screw threads 42 of the coupling body.

A feature of this last embodiment of the invention is the concept of using split bushings which may be temporarily spread to pass over the tube flanges. Such an arrangement obviously facilitates assembly of the coupling since it simplifies the problem of installing the radially inward flange-engaging means at the respective ends of the coupling body. In accord with this concept, each of the bushings 45 is of split construction providing two ends 48 as indicated in FIG. 5. Preferably each of the two bushings 45 is further formed with a circumferential series of radial slots 50 which permit rotation of the bushing by a suitable spanner-type tool and which also facilitate flexure of the tubing as required for temporary expansion to pass over the tube flanges.

Once a split bushing 45 is in place, it is forcibly contracted to the desired diameter. When the contracted split bushing 45 is threaded into the coupling body 40, the coupling body confines the bushing against any tendency to expand. It is apparent that the two bushings may be rotated to cause the flared portions 44 of the coupling body to ride over the two O-rings 18 for radial compression of the O-rings as heretofore described.

My description in specific detail of the selected embodiments of the invention will suggest various changes, substitutions and other departures from my disclosure within the spirit and scope of the appended claims.

I claim:

1. In a coupling for connecting two confronting tube ends, the combination of: a pair of radial flanges on each of said tube ends spaced apart to form a circumferential groove on the tube end; an elastomer sealing ring seated in each of said grooves; a cylindrical body to bridge the two tube ends and enclose all of said flanges, the unrestrained radial dimension of each of said sealing rings being greater than the radial clearance between the coupling body and the bottom of the groove in which the sealing ring is seated whereby each sealing ring is radially compressed by the coupling body for effective sealing contact both with the coupling body and with the bottom wall of the groove in which the sealing ring is seated with consequent axial elongation of the sealing ring, each of said grooves being of a width dimensioned to oppose the axial elongation of the sealing ring with consequent increase in the radial pressure of the sealing ring outwardly against the coupling body and inwardly against the corresponding tube end, the interior of one end of said coupling body being flared to facilitate sliding advance of the coupling body over the corresponding sealing ring with consequent radial compression of the sealing ring, said one end of the coupling body being formed with a first screw thread; radially inwardly extending means on the two ends respectively of said coupling body in abutment with the rearmost flanges of the two tube ends to limit separation movement of the two tubes, one of said inwardly extending means being at the flared end of the coupling body and being a ring member formed with a second screw thread for releasable engagement with said first screw thread, said two screw threads being positioned and dimensioned for screw action of the ring member against the rearmost flange of the corresponding tube end to force said flared portion of the coupling body over the corresponding sealing ring.

2. A combination as set forth in claim 1 in which said ring member is a bushing, said bushing being split for radial expansion to clear the flanges of the corresponding tube end prior to engagement with the coupling body.

3. A combination as set forth in claim 2 in which said bushing has a radial flange and said radial flange has a series of circumferentially spaced outer radial slots to facilitate the expansion of the bushing and to receive a tool for rotating the bushing.

4. In a coupling for connecting two confronting tube ends, the combination of: a forward circumferential flange and a rearward circumferential flange forming an outer circumferential groove on each tube end; an elastomer sealing ring seated in each of said grooves; a cylindrical body to bridge the two tube ends and enclose all of said flanges and said sealing rings, the unrestrained radial dimension of each of said sealing rings being greater than the radial clearance between the surrounding cylindrical body and the bottom of the groove in which the sealing ring is seated whereby each sealing ring is radially compressed by the coupling body for sealing contact both with the coupling body and with the bottom wall of the groove in which the sealing ring is seated with consequent axial elongation of the sealing ring, each of said grooves being of a width dimensioned to oppose the axial elongation of the sealing ring with consequent increase in the radial pressure of the sealing ring outwardly against the coupling body and inwardly against the corresponding tube end, each end of said coupling body being formed with a screw thread and being internally flared to facilitate sliding advance of the coupling body over the corresponding sealing ring with consequent radial compression of the sealing ring, the radial extent of the internal flare being at least one-fourth of the diameter of the sealing ring; radially inwardly extending circumferential flange means on the two ends respectively of said coupling body in abutment with the rearmost flanges of the two tube ends to confine all of said flanges of the tube ends axially to limit separation movement of the two tube ends, each of said inwardly extending flange means being formed with a screw thread for releasable engagement with the corresponding screw thread of the coupling body, each pair of the mutually engageable screw threads being positioned and dimensioned for screw action to force the corresponding flared portion of the coupling body over the corresponding sealing ring.

5. In a coupling for connecting two thin-walled confronting tube ends, the combination of: a forward circumferential flange and a rearward circumferential flange on each of said tube ends forming an outer circumferential groove, each of said flanges comprising a double thickness fold in the wall of the tube; an elastomer sealing ring seated in each of said grooves; a ferrule embracing each of said tube ends, said ferrule having a radial flange rearward of and reinforcing the rearmost folded flange on the tube end; a cylindrical body to bridge the two tube ends and enclose said ferrule flanges, the unrestrained radial dimension of each of said sealing rings being greater than the radial clearance between the coupling body and the bottom of the groove in which the sealing ring is seated whereby each sealing ring is radially compressed by the coupling body for sealing contact both with the coupling body and with the bottom wall of the groove in which the sealing ring is seated with consequent axial elongation of the sealing ring, each of said grooves being of a width dimensioned to oppose the axial elongation of the sealing ring with consequent increase in the radial pressure of the sealing ring outwardly against the coupling body and inwardly against the corresponding tube end, each end of said coupling body being formed with a screw thread and being internally flared to facilitate sliding advance of the coupling body over the corresponding sealing ring with consequent radial compression of the sealing ring; radially inwardly extending means on the two ends respectively of the coupling body in abutment with the two ferrule flanges to confine said ferrule flanges axially to limit separation movement of the two tube ends, each of said inwardly extending means being formed with a screw thread for releasable engagement with the corresponding screw thread of the coupling body, each pair of mutually engageable screw threads being positioned and dimensioned for screw action to force the corresponding flared portion of the coupling body over the corresponding sealing ring.

References Cited by the Examiner
UNITED STATES PATENTS

| | | | |
|---|---|---|---|
| 577,413 | 2/1897 | Bray | 285—39 |
| 760,216 | 5/1904 | Laws | 285—424 |
| 804,149 | 11/1905 | Meyer | 285—354 |
| 1,533,886 | 4/1925 | Mueller | 285—354 |
| 1,705,811 | 3/1929 | Eidel | 85—33 |
| 1,822,887 | 9/1931 | Hagstedt | 285—357 |
| 2,516,743 | 7/1950 | Allin | 285—163 |
| 2,521,127 | 9/1950 | Price | 285—347 X |
| 2,599,389 | 6/1952 | Hume | 285—353 |
| 2,738,992 | 3/1956 | Heisler | 285—369 X |
| 2,826,437 | 3/1958 | Detweiler | 285—353 |
| 3,002,771 | 10/1961 | Chakroff | 285—353 |

FOREIGN PATENTS

| | | |
|---|---|---|
| 785,652 | 5/1935 | France. |
| 1,146,949 | 5/1957 | France. |
| 28,128 | 12/1910 | Great Britain. |

CARL W. TOMLIN, *Primary Examiner.*